United States Patent
Naoi

(12) 
(10) Patent No.: US 6,212,786 B1
(45) Date of Patent: Apr. 10, 2001

(54) THIN BOARD HOLDING DEVICE AND METHOD OF AND APPARATUS FOR MEASURING THICKNESS OF THIN BOARD

(75) Inventor: Kaoru Naoi, Kawasaki (JP)

(73) Assignee: Kuroda Precision Industries, Ltd., Kawasaki (JP)

(*) Notice: Subject to any disclaimer, the term of this patent is extended or adjusted under 35 U.S.C. 154(b) by 0 days.

(21) Appl. No.: 08/837,978

(22) Filed: Apr. 14, 1997

(30) Foreign Application Priority Data

Apr. 16, 1996 (JP) .................................................. 8-118435

(51) Int. Cl.[7] .............................. G01B 5/20; B23Q 16/00
(52) U.S. Cl. ........................ 33/573; 33/551; 33/DIG. 2
(58) Field of Search ........................... 33/573, 832, 833, 33/549, 551, 553, 554, 555, DIG. 2; 414/941

(56) References Cited

U.S. PATENT DOCUMENTS

| | | | |
|---|---|---|---|
| 4,750,141 | * | 6/1988 | Judell et al. ............................. 33/551 |
| 4,771,550 | * | 9/1988 | Kober ..................................... 33/573 |
| 4,860,229 | | 8/1989 | Abbe et al. . |
| 5,351,412 | * | 10/1994 | Furuhata et al. ....................... 33/573 |

FOREIGN PATENT DOCUMENTS

| | | |
|---|---|---|
| 59-46030 | 3/1984 | (JP) . |
| 62-111442 | 5/1987 | (JP) . |
| 63-114870 | 5/1988 | (JP) . |
| 4-152512 | 5/1992 | (JP) . |
| 6-61202 | 3/1994 | (JP) . |

\* cited by examiner

*Primary Examiner*—Christopher W. Fulton
(74) *Attorney, Agent, or Firm*—Evenson, McKeown, Edwards & Lenahan, P.L.L.C

(57) ABSTRACT

A thin board holding device 2A for holding a thin board in a plane state to measure the thickness of a thin board is disclosed, which has a number of spot supports 3 with adsorbing portion for holding a thin board 1 attached by suction to the top. The thin board 1 is held in a multiple point support fashion to the spot supports 3. By moving a measuring terminal of a measuring instrument to a measuring point on the thin board, which has one surface of the thin board 1 set on the thin board holding device 2A, the level of the other surface of the thin board 1 from a reference surface A supporting the thin board holding device at a reference position is measured. The dimension from the reference position A to a thin board adsorption surface 3a of the spot support 3 is used as a computational constant, and the thickness of the thin board is calculated from the measured level of the other surface of the thin board 1 and the computational constant.

16 Claims, 5 Drawing Sheets

THIN BOARD HOLDING DEVICE AND METHOD OF AND APPARATUS FOR MEASURING THICKNESS OF THIN BOARD

BACKGROUND OF THE INVENTION

1. Field of the Invention

This invention relates to a thin board holding device for holding a thin board in a plane state to measure the thickness of the thin board and also to a method of and an apparatus for the thin board thickness measurement on holding a thin board in a plane state.

2. Description of the Related Art

The thickness of a thin board, such as a film-like sheet or a silicon wafer, is usually measured with a micrometer.

To measure the thickness, the thin board is held with one hand, and the micrometer is operated with the other hand. Therefore, when the thin board is inserted into and pushed out from the space between micrometer measurement terminals, the thin board may strike or be distorted between the terminals, and this may result in its breakage.

Therefore, it is difficult to accurately measure the thickness of a thin board, particularly a large diameter and fragile thin board such as a silicon wafer.

FIG. 13 shows a related technique, in which displacement gauges 101 and 102 provided on a frame 100 over and under a thin board 1 under measurement measures the thickness of the thin board 1.

In this system, the displacement gauges 101 and 102 should be such that their relative positions are not varied and that the thin board under measurement can be passed between them. Therefore, the system is inevitably rather elaborated, and a high technical level is necessary.

In addition, in this system it is necessary to move a silicon wafer to measure the thickness thereof at a plurality of designated points, so that greater caution and time are required to prevent breakage of the wafer, thus reducing the production rate and increasing the cost of manufacture. It has been desired to solve this problem.

OBJECT AND SUMMARY OF THE INVENTION

In view of the above circumstances, it is an object of the invention to provide a thin board holding device and a method of and an apparatus for measuring the thickness of a thin board, which can prevent breakage of large diameter and fragile thin boards such as silicon wafers and permit accurate measurement of the thin board thickness.

Another object of the invention is to provide a thin board holding device and a method of and an apparatus for measuring the thin board thickness, which permit the thin board thickness measurement with a simple construction.

A further object of the invention is to provide a method of and an apparatus for thin board thickness measurement, which permit accurate thickness measurement in a short period of time.

To attain the above objects of the invention, according to a first aspect of the invention, a thin board holding device for holding a thin board in a plane state to measure the thickness of said thin board is provided, which comprises an adsorption portion including a plurality of spot supports for receiving one surface of said thin board to hold said thin board in a multiple point support fashion such that said thin board is held attached by adsorption to said spot supports.

According to the invention, effectively the dimension between a reference surface with the thin board holding device placed thereon and the surface of the adsorption portion in contact with the thin board is set to a predetermined dimension as a computational constant.

According to the invention, effectively the adsorption portion has two or more different surfaces to be in contact with a thin board to be able to set two or more values as the predetermined dimension for holding a thin board having locally different thicknesses.

FIGS. 1 and 2 show a thin board holding device 2A, which has a number of spot supports 3 each having an adsorption face 3a which is in contact with a thin board (or wafer) 1.

As shown in FIG. 3, each spot support 3 has a exhausting port 3Ab such that the thin board 1 can be adsorbed under vacuum to the adsorption face 3a by suction from sucking means (not shown) through the exhausting port 3Ab.

As shown in FIG. 1, the spot supports 3 are provided as many as corresponded to each of support points S1 to S9 in an arrangement of a cross. This arrangement, however, is merely an example, and it is possible to provide the spot supports in any arrangement.

The spot supports 3 may not all be capable of adsorption under vacuum; they may be incapable of sucking in a zone where the strain of the thin board poses no problem when the thickness of the thin board is not taken into consideration.

With the thin board supported at multiple spots or points, deterioration of the flatness of the thin board, by dust particles intruding into the space between the thin board and the supporting surface, is less liable compared to the case where the thin board is supported over the entire surface.

By moving a measuring terminal of a measuring instrument to a measuring point on the thin board, which has one surface set on the thin board holding device, the level of the other surface of the thin board from a reference surface supporting the thin board holding device at a reference position can be measured.

With the provision of data of the level of the adsorption attached surface of the thin board from the reference position, the thickness of the thin board can be determined by calculation from such data.

The thin board holding device thus can be used for the thin board thickness measurement. In this case, one surface of the thin board is held stationary, and the level of the other thin board surface is measured. Breakage of the thin board, which may even be very fragile such as a silicon wafer, is thus far less possible.

A stepped thin board 10 with a local stepped portion having a different thickness as shown in FIG. 10, may be held by providing a spot support 3' which is reduced by difference in level with corresponded to the stepped portion.

The reduced dimension spot support 3' may be intrinsically provided on the thin board holding device 2B, but desirably the spot supports 3 and 3' can be selectively detachably installed by screwing.

The spot supports each include:

adsorbing means having an elastic skirt portion;

a spherical projection extending from the bottom of a space defined by the skirt portion to the top opening of the adsorbing means and having a lower level end portion than the level of the skirt portion; and an air suction opening formed in the bottom;

the thin board being held in contact with an end portion of the spherical projection by suction through the opening.

As shown in FIG. 5, the spot support 3B has an adsorbing means (i.e., an adsorbing pad) 5 with an elastic skirt portion. A thin board (or wafer) 1, the surfaces of which are not mirror-finish surfaces but rough surfaces as shown in FIG. 6, thus can be attached by adsorption to the upper edge 5a of the adsorbing means 5 by exhausting air through an exhausting port 3Bb without air leak, and it is possible to improve the state of holding of the thin board.

A spherical projection 4 is provided such that it extends from the bottom of the adsorbing pad (i.e., the top 3Bf of the spot support) to the top opening of the adsorbing pad. Its upper end 4a is lower in level than the level of the skirt and in contact with a very small surface area of the thin board 1.

Dust particles in the adsorbing pad are exhausted together with air through the exhausting port 3Bb, thus preventing the presence of dust particles in the space between the thin board 1 and the end portion 4a of the spherical projection 4 as much as possible.

According to the first aspect of the invention, the sport supports are detachable from the thin board holding device. For example, the spot supports may each have a thread formed in a lower portion, and the holding device also has threads or threading screws. In this case, various spot supports may be detachable installed for use in dependence on the kind of the thin board.

According to the first aspect of the invention, effectively the thin board holding device further comprises the projection surface, in addition to said spot support, being spaced apart by the same distance as the distance from the reference surface with the thin board holding device placed thereon to the surface of the spot supports in contact with the thin board.

In this case, without preliminary storage of the computational constant T, the thickness of the thin board may be obtained by computation by measuring the level of the projection surface.

According to a second aspect of the invention, a method of measuring the thickness of a thin board in a plane state is provided, which comprises the steps of:

holding one surface of the thin board attached by adsorption to a number of thin board holding surfaces being located apart at a predetermined distance from a reference surface; and measuring the thickness of the thin board by taking the difference between the dimension between the other surface of the thin board and the reference surface and the dimension between the said thin board holding surfaces and the said reference surface.

According to the second aspect of the invention, effectively the dimension between the thin board holding surfaces and the reference surface is preliminarily stored as a computational constant, and the dimension between the other surface of the thin board and the reference surface is measured and used as data together with the computational constant to calculate the thickness of the thin board.

It is further effective to hold the thin board in a multiple point support fashion using a thin board holding means having a number of spot supports for receiving one surface of the thin board, and measure the level of the opposite side portions of the other surface of the thin board being corresponded to the said thin board holding surfaces.

According to the second aspect of the invention, a number of holding surfaces, on which the thin board is held, are provided apart at a predetermined distance from a reference surface.

For example, as shown in FIG. 2, the lower surface 2Ab of the holding device is made to be a reference surface A, and the dimension D between the reference surface A and the surface 3a of each spot support 3 in contact with the thin board is made to be a computational constant T.

The level of the top surface S1 to S9 of the supported portions of the thin board 1 multiple point supported by the spot supports 3, may be measured to take the difference (Y–T) of the computational constant T from the measured level Y as the thickness of the thin board 1.

When the dimension between the holding surface and the reference surface is preliminarily stored as the computational constant T, the difference can be immediately computed from the measured level Y of the upper surface S1 to S9 of the supported portions of the thin board 1.

One surface of the thin board is held adsorbed to the holding surfaces, and these portions of the thin board are held stably. Thus, by measuring the level of the portions of the other surface of the thin board corresponding to the opposite side holding surfaces, an accurate measurement can be obtained.

According to the second aspect of the invention, effectively a projection surface, in addition to said holding surface, is provided such that it is spaced apart from the reference surface by the same distance as the distance from the reference surface to the thin board holding surface, and the dimension between the other surface of the thin board and said reference surface, and the dimension between the said projection surface and the reference surface are measured.

It is further effective to:

prepare a thin board holding means with a number of spot supports having said holding surface for supporting by adsorption one surface of the thin board;

measure the dimension between the reference surface and the said projection surface in contact with the thin board as a computational constant; and measure the level of the opposite side portions of the other surface of the thin board corresponding to the said thin board holding surfaces to take the difference between the said measured level and the computational constant as the thickness of the thin board.

With the provision of the said projection surface, the computational constant noted above need not be stored, but can be determined the computational constant by measuring the dimension between the reference surface and the said projection surface in contact with the thin board. The thin board holding means thus can be constructed to be replaceable, thus precluding complication of the construction that is the case where the thin board holding means is provided with identifying means for taking the coincidence of the level of a substitute thin board holding means and the stored computational constant.

According to the second aspect of the invention, effectively:

the thin board holding means is prepared with a number of spot supports having said holding surface for supporting by adsorption one surface of the said thin board;

One surface of a thickness gauge is supported on the said projection surface, the distance between the reference surface and the said projection surface is obtained as a computational constant from both the measured level from the reference surface to the other surface of the said thickness gauge and the dimension of the thickness of the said thickness gauge; and the difference between the measured level of the other surface of the thin board and the computational constant is taken as the thickness of the thin board.

As shown in FIG. 11, an auxiliary projection surface (or auxiliary spot support) 3" on which the thin board 1 is not held, is provided in addition to the spot supports 3 on which the thin board 1 is held. The dimension or level D from the reference surface A to the top surface of the auxiliary spot support 3" is measured, and the computational constant is obtained as D=T.

A thickness gauge 6 having a thickness t is put on the auxiliary spot support 3", and the measured level Z from the reference surface A to the top surface of the thickness gauge 6 is measured to obtain the computational constant T as Z−t=T.

The level of the top surface SI to S9 of the supported portions of the thin board 1 held by multiple point support by the sport supports 3 is measured, and the difference (Y−T) of the computational constant T from the measured level Y is taken as the thickness of the thin board 1.

Thus, when the computational constant T is not stored, it can be obtained by measuring the level of the top of the auxiliary spot support or the top surface of the thickness gauge.

According to a third aspect of the invention, a device for measuring the thickness of a thin board in a plane state is provided, which comprises:

thin board holding means including a number of spot supports each having a thin board holding surface for holding by adsorption one surface of the thin board, the thin board being held in a multiple point support fashion by the spot supports;

measuring means for measuring the dimension from the reference surface of the said thin board holding means in the direction of the thickness of the thin board; and computing means for computing the difference between the dimension from the reference surface to the thin board holding surfaces of the spot supports in contact with the thin board and the dimension from the reference surface to the other surface of the thin board.

According to the invention, effectively the dimension between the reference surface with the thin board holding means placed thereon and the thin board holding surfaces of the spot supports in contact with the thin board is set as a computational constant.

According to the invention, it is further effective that the thin board holding means has two or more different surfaces to be in contact with a thin board to be able to set two or more values as the predetermined dimension for holding a thin board having locally different thickness.

According to the third aspect of the invention, as shown in FIGS. 1 and 2, the thin board holding means (or holding device) 2A has a number of spot supports 3 with adsorbing portion such that one surface of a thin board (or wafer) 1 is held by adsorption in a multiple point support fashion on the end faces 3a of the spot supports 3.

As shown in FIG. 3, the spot supports 3 are each exhausted by suction means (not shown) through an exhausting port 3Ab, thus holding a thin board by adsorption under vacuum on their adsorption faces 3a. While these spot supports 3 are shown arranged in the form of a cross in correspondence to the positions of the support points S1 to S9, this arrangement is merely exemplary, and the spot supports may be arranged in any other form as well.

The spot supports 3 may not all be capable of adsorption under vacuum; they may be incapable of sucking and exhausting in a zone where the thickness of the thin board is taken into no consideration.

With the thin board supported at multiple spots or points, deterioration of the flatness of the thin board, by duct particles introducing into the space between the thin board ends the supporting surface, is less liable compared to the case where the thin board is supported over the entire surface.

By moving a measuring terminal of a measuring instrument to a measuring point on the thin board, at where has one surface of thin board set on the thin board holding device, the level of the other surface of the thin board from a reference surface supporting the thin board holding device at a reference position is measured.

With the provision of data of the level of the adsorption attached surface of the thin board from the reference position, the thickness of the thin board can be determined by calculation from such data.

When the thin board holding device is used for the thin board thickness measurement, one surface of the thin board is held stationary, and the level of the other thin board surface is measured. Breakage of the thin board, which may even be very fragile such as a silicon wafer, is thus far less possible.

A stepped thin board 10 with a local stepped portion having a different thickness as shown in FIG. 10, may be held by providing a spot support 3' which is reduced in dimension in correspondence to the stepped portion.

The reduced dimension spot support 3' may be intrinsically provided on the thin board holding device 2B, but desirably the spot supports 3 and 3' can be selectively detachably installed by screwing.

According to the third aspect of the invention, effectively the spot supports each include:

adsorption means having an elastic skirt portion;

a spherical projection extending from the bottom of a space defined by the skirt portion to the top opening of the adsorption means and having a lower level end portion than the level of the skirt portion; and an air suction opening formed in the bottom;

the thin board being held in contact with an end portion of the spherical projection by suction through the opening.

According to the third aspect of the invention, as shown in FIG. 5, the spot support 3B has an adsorbing means (i.e., an adsorbing pad) 5 with an elastic skirt portion.

A thin board (or wafer) 1, even though the surfaces of which are not mirror-finish surfaces but rough surfaces as shown in FIG. 6, thus can be attached by adsorption to the upper edge 5a of the adsorbing pad 5 with the elastic skirt portion by exhausting air through an exhausting port 3Bb without air leak, and it is possible to improve the state of holding of the thin board.

A spherical projection 4 is provided such that it extends from the bottom of the adsorbing pad (i.e., the top 3Bf of the spot support) to the top opening of the adsorbing pad. Its level of end portion 4a is lower than the level of the skirt and in contact with a very small surface area of the thin board 1. Dust particles in the adsorbing pad are exhausted together with air through the exhausting port 3Bb, thus preventing the presence of duct particles in the space between the thin board 1 and the end portion 4e of the spherical projection 4 as much as possible.

According to the third aspect of the invention, effectively the spot supports are detachable from the thin board holding device. For example, the spot support may each have a thread in a lower portion, and the holding device has threads for screwing screws through the holding device and the spot supports. Various spot supports thus may be detachably installed in dependence on the kind of the thin board.

According to the third aspect of the invention, it is also effective to provide a projection surface, which is spaced apart from a reference surface by the same distance as the distance from the reference surface of said thin board holding means to the surface of the spot supports in contact with the thin board. In this case, without preliminary storing of the computational constant T, it is possible to calculate the computational constant and the thickness of the thin board by measuring the level of the said projection surface.

According to the third aspect of the invention, it is further effective that the thin board holding means can hold one surface of a plurality thin boards, the thickness of the thin boards can be measured at a time by measuring the level of the other surfaces of the said thin boards.

With this construction of the thin board holding means 2C, as shown in FIG. 11, when a plurality of thin boards 1 and 1' are set once on the said thin board holding means 2C, their thickness of plural thin board can be measured at once setting with a measuring instrument 7 as shown in FIG. 12. It is thus possible to obtain quick thickness measurement.

According to the third aspect of the invention, with the thin board supported at multiple spots or points, deterioration of the flatness of the thin board, by duct particles intruding into the space between the thin board and the supporting surface, is less liable compared to the case where the thin board is supported over the entire surface.

By moving a measuring terminal of a measuring instrument to a measuring point on the thin board, which has one surface set on the thin board holding device, the level of the other surface of the thin board from a reference surface supporting the thin board holding device at a reference position can be measured. As computational constant T the data from the reference position to the level of the adsorption surface of the thin board, the thickness of the thin board can be determined by calculating from such measured data of said thin board surface.

A sheet thickness measuring system thus can be provided, which can deal with even very fragile thin boards such as silicon wafers with a far low possibility of breakage.

DETAILED DESCRIPTION OF THE PREFERRED EMBODIMENTS

Figure 1:
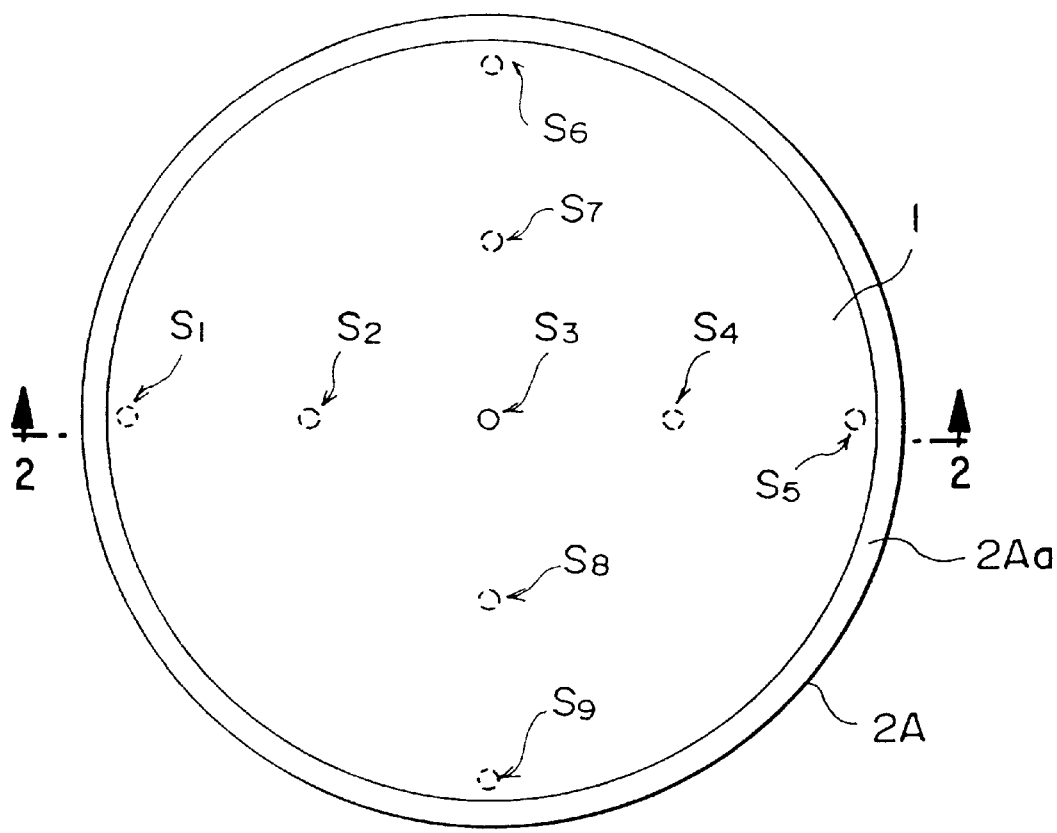
FIG. 1 is a view showing a first embodiment of the thin board holding device according to the invention.

Preferred embodiments of the invention illustrated in the drawings will now be described in detail. Unless articularly described, the sizes, materials, shapes, relative positions, etc. of the components described in connection with the embodiments have no sense of limiting the invention but are merely exemplary.

Figure 2:
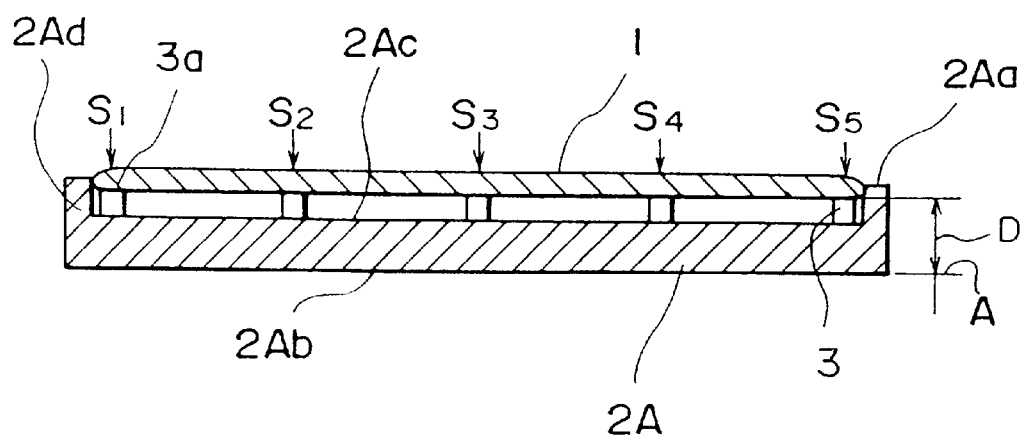
FIG. 2 is a sectional view taken along line A—A in FIG. 1.

FIG. 1 is a plan view showing an embodiment of the holding device holding a wafer 1 as a thin board having a thin thickness compared to the surface area. FIG. 2 is a sectional view taken along line A—A in FIG. 1.

Referring to these figures, a thin board holding device 2A is shown, which is made of a highly rigid material, such as ceramics, and has a tray-like shape. The holding device 2A has an inner surface 2Ac surrounded by a peripheral wall 2Ad.

On the inner surface 2Ac, nine spot supports 3 are disposed in a cross arrangement. The wafer 1 is held on contact faces 3a of the spot supports 3. In this state, a slight clearance is formed between the edge of the wafer 1 and the inner surface of the peripheral wall 2Ad. When the wafer 1 is moved along its plane, its outer edge contacts with the inner surface of the peripheral wall 2Ad. The wafer 1 is thus prevented from getting out of the holding device due to its lateral movement.

The contact face 3a of each spot support 3 is spaced apart by a distance D from a reference surface A, on which the lower surface 2Ab of the holding device 2A is supported.

Figure 3:
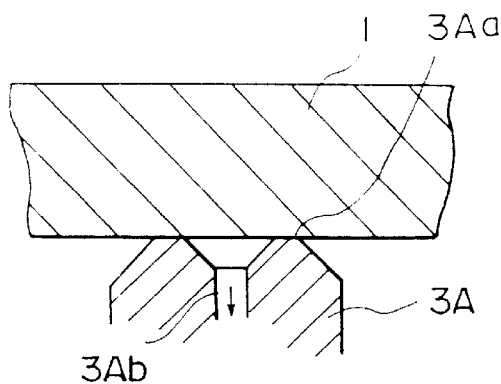
FIG. 3 is a view showing a first example of spot support to be in contact with a thin board.

As shown in FIG. 3, each spot support 3 has an inner exhausting port 3Ab extending coaxially with it and is connected to an absorbing mechanism A (not shown). When the wafer 1 is placed on the spot support 3, it can be held attached thereto by suction through the exhausting port 3Ab.

With the above construction of the embodiment, in which the thin board (i.e., the wafer) is supported at multiple sports or points, deterioration of the flatness of the thin board, by dust particles intruding into the space between the thin board and the supported surface, is less liable compared to the case where the thin board is supported over the entire surface.

By moving a measuring terminal of a measuring instrument to a measuring point on the thin board, where the thin board is set on the thin board holding device, the dimension from a reference position of under surface of the thin board holding device to the upper surface of the thin board can be measured.

With the provision of data of the level of the adsorption surface of the thin board from the reference position, the thickness of the thin board can be determined by calculation from such data.

Where the thin board holding device is used for thin board thickness measurement, one surface of the thin board is held stationary, and the level of the upper surface of thin board is measured. Breakage of the thin board, which may even be very fragile such as a silicon wafer, is thus far less possible.

In the embodiment the spot supports 3 are disposed in a cross arrangement in correspondence to support points S1 to S9, this arrangement is merely an example, any other form of arrangement is possible as well.

The spot supports 3 may not all necessary to have an adsorption under vacuum, and may be only the spot supports portion without absorbing and exhausting, in a zone, in which no strain problem is posed from the consideration of the thickness of the thin board.

Figure 4:
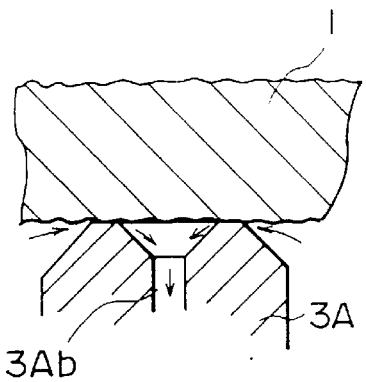
FIG. 4 is a view showing the first example of the spot support in contact with a coarse surface of thin board.

As shown in FIG. 3, a mirror-finish surface wafer 1 can be sucked by the spot support 3A. As shown in FIG. 4, however, it is difficult for a coarse surface wafer 1 to be sucked, even though the contact surface 3Aa of the spot support 3A is a mirror-finish surface, because air flow into the spot support from the outside.

Figure 5:
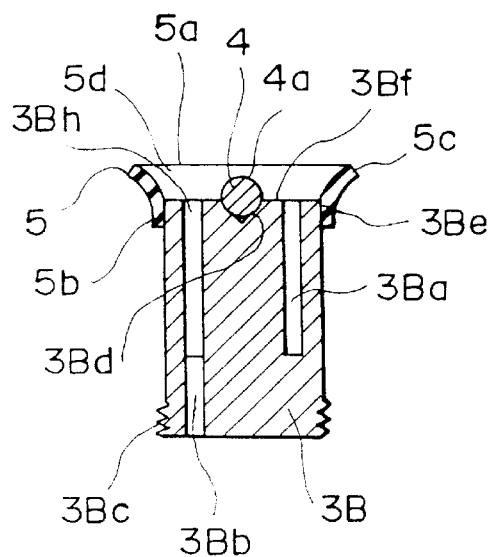
FIG. 5 is a view showing a second example of the spot support.

FIG. 5 shows a different example of spot support 3B which is suitable for use in such a case. The spot support 3B has an adsorbing pad 5 having an elastic skirt portion 5C and a spherical projection 4, which extends from the bottom 3B*f* of a space defined by the skirt portion 5*c* of the adsorbing pad 5 to the top opening 5*d* thereof and has an end portion 4*a* (spherical body) on a lower level than the skirt portion, and an air absorbing opening port 3B*h* provided in the bottom 3B*f*. Thus, a thin board 1 can be held in contact with the end portion 4*a* of the spherical projection by suction through the absorbing opening port.

Figure 6:
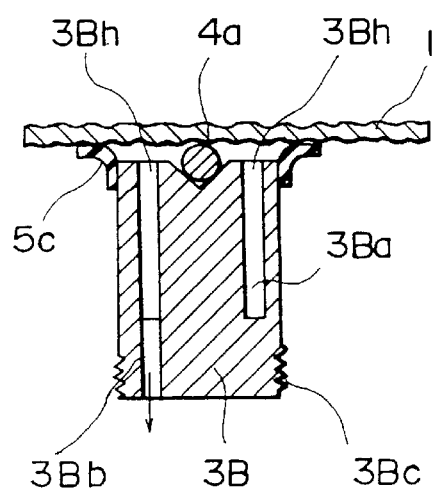
FIG. 6 is a view showing the second example of the spot support in contact with a coarse surface of thin board.

FIG. 5 is a sectional view showing a spot support supporting no wafer held by adsorption. FIG. 6 is a sectional view showing the spot support supporting a wafer held by adsorption.

Referring to the figures, the spot support 3B is made of a metal or a hard synthetic resin and cylindrical in shape. A top portion of the spot support 3B is defined by the skirt 5*c*, and the base of skirt portion 3B*f* has a central conical groove 3B*d*, in which a hard spherical body 4 of ruby or a ceramic material is received and secured in position by adhesive.

The spot support 3B has an annular groove 3B*a* having an air suction opening port 3B*h* in the bottom 3B in the surrounding and neighborhood of the spherical body 4. An air exhausting duct 3B*b* extends downward from the annular groove 3B*a*.

The air exhausting duct 3B*b* is coupled to a suction mechanism such as a vacuum pump (not shown) to absorb air through the air suction port 3B*h*.

The adsorbing pad 5 with the skirt portion 5*c* made of rubber or like elastic material, has its stem fitted on an upper end portion 3B*e* of the spot support 3B such that the upper edge 5*a* of the opening portion 5*d* defining the skirt portion 5C of adsorbing pad 5 is at a higher level by a predetermined space than the upper end portion 4*a* of the spherical body 4.

This predetermined space is determined by the elastic force of the skirt portion of the adsorbing pad 5 and the suction force to suck air through the exhausting opening 3B*b* for holding a thin board for which various value depend on these force value.

With this construction of the spot support 3B, by placing a wafer 1 on the upper edge 5*a* of the adsorbing pad 5 shown in FIG. 5 and absorbing air in the skirt portion 5*c* by driving a vacuum pump (not shown) or the like through the exhausting portion 3B*b*, the skirt portion 5*c* is flexed as shown in FIG. 6, and the wafer 1 is held attached by adsorption to the spot support 3B with its lower surface in contact with the upper end 4*a* of the spherical body 4.

Thus, a thin board 1, the surfaces of which are not mirror-finished surfaces but rough surfaces, can be attached by adsorption to the upper edge 5*a* of the adsorbing pad 5 having the skirt portion with elastic force by exhausting air through an exhausting port 3B*b* without air leak, and it is possible to improve the state of holding of the thin board.

In such construction that the spherical body 4 having an upper end portion 4*a* which is lower in level than the level of the skirt portion extending from the bottom of the adsorbing pad (i.e., the top face 3B*f* of the spot support) to the top opening of the adsorbing pad is provided on the said bottom, it is in contact with a very small surface area of the thin board 1. Dust particles in the adsorbing pad are exhausted together with air through the exhausting port 3B*b*, thus preventing the presence of dust particles in the space between the thin board 1 and the end 4*a* of the spherical projection 4 as much as possible.

In this example of the spot support, in which the annular groove 3B*a* connected to the exhausting duct 3B*b* is provided near the spherical body 4, and the skirt portion 5*c* of the adsorbing pad 5 surrounding the spherical body 4 and the annular groove 3B*a* may be small in size to permit sucking of the neighborhood of the spherical body 4. No sucking force is thus exerted to other parts of the wafer 1, and the deformation of the wafer 1 is not made up for the warping or the like of the wafer 1. It is thus possible to hold the wafer satisfactorily.

This example of the spot support 3B has a lower threaded portion 3B*c*. It is thus possible to use various spot supports interchangeably by providing the holding device 2A with threads for screwing the threaded portion 3B*c*.

Figure 7:
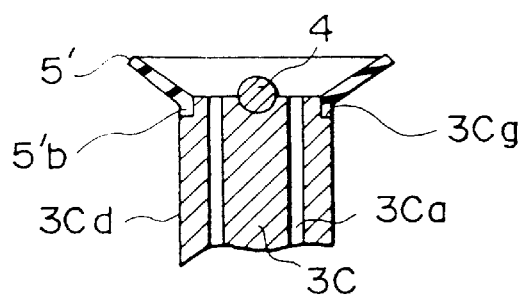
FIG. 7 is a view showing a third example of the spot support.

FIG. 7 is a view showing a third example of the spot support. This example of the spot support 3C is different from the example of the spot support shown in FIG. 5 in that it has a shoulder 3C*g* near its top and that the adsorbing pad is fitted on and secured to the upper end portion of the spot support 3C with the lower end of its stem 5'*b* in contact with the shoulder 3C*g*.

With this construction, a stress tending to push down the stem 5'*b* of the adsorbing pad, which may be generated in the elastic skirt portion due to flexing of the adsorbing pad caused by a sucking force under vacuum, is absorbed by the shoulder 3C*g*, and the adsorbing pad is not deviated downward.

Figure 8:
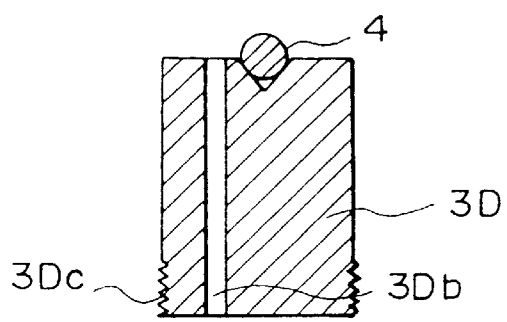
FIG. 8 is a view showing a fourth example of the spot support.

FIG. 8 is a view showing a fourth example of the spot support 3D. This example is different from the example shown in FIG. 5 in that it has no annular groove but the exhausting duct 3D*b* extends up to the vicinity of the spherical body 4.

With this construction, the spherical body may not be provided at the center of the spot support. Since only a single exhausting passage may be provided, it is possible to simplify the construction and reduce the outer diameter of the spot support.

Figure 9:
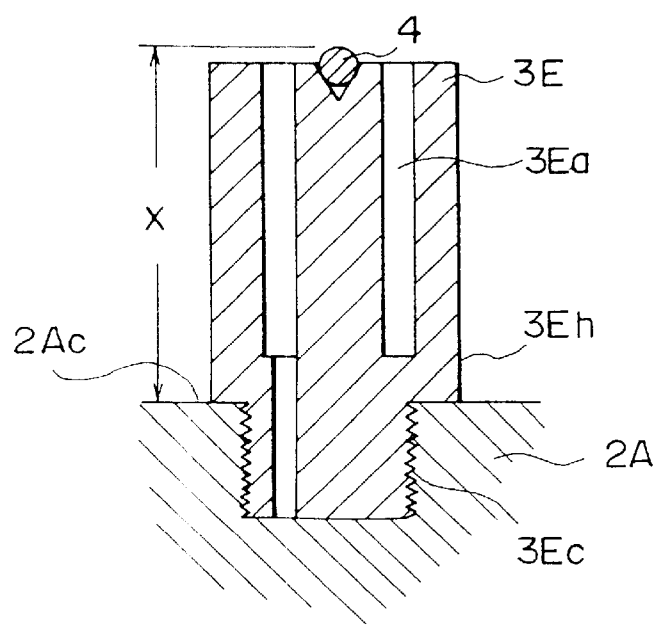
FIG. 9 is a view showing a fifth example of the spot support.

FIG. 9 is a view showing a fifth example of the spot support. This example of the spot support 3E is different form the example shown in FIG. 5 in that it has a reduced diameter threaded portion 3E*c* and is installed on the spot support receiving surface 2A*c* of the holding device 2A such that its stepped surface 3E*h* in which the threaded portion 3E*c* terminates is in contact with the surface 2A*c*.

With this construction, by accurately setting the distance X between the surface 2A*c* of the holding device 2A and the stepped surface 3E*h* of the spot support 3E, the surface on which to place the wafer 1 can be set accurately with the stepped surface 3E*h* and the spot support receiving surface 2A*c* brought into contact with each other by screwing the spot support 3E in the holding device 2A.

A method of thickness measurement will now be described with reference to FIG. 12.

As described before in connection with FIG. 1, a thin board holding device is prepared, which has a number of spot supports with a top thin board holding surface for holding a thin board by adsorption. The distance or dimension between a reference surface on which to support the holding device and the thin board holding surfaces of the spot supports is set as a computational constant, and the thickness of the thin board is measured by taking the difference of the computational constant from the measured level of the upper surface of the portions of the thin board held in the multiple point support fashion on the spot supports.

Figure 12:
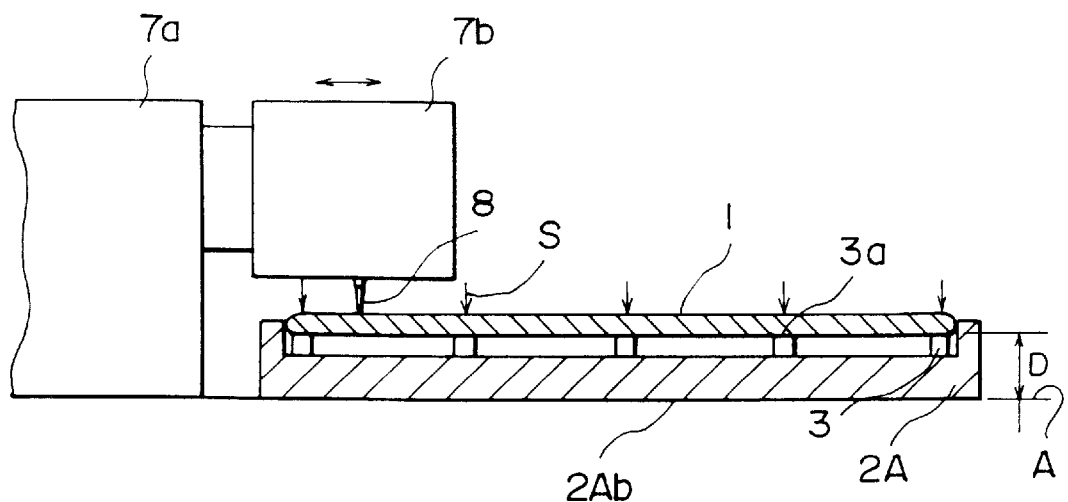
FIG. 12 is a view showing a first embodiment of the apparatus for measuring the thickness of a thin board.
Figure 13:
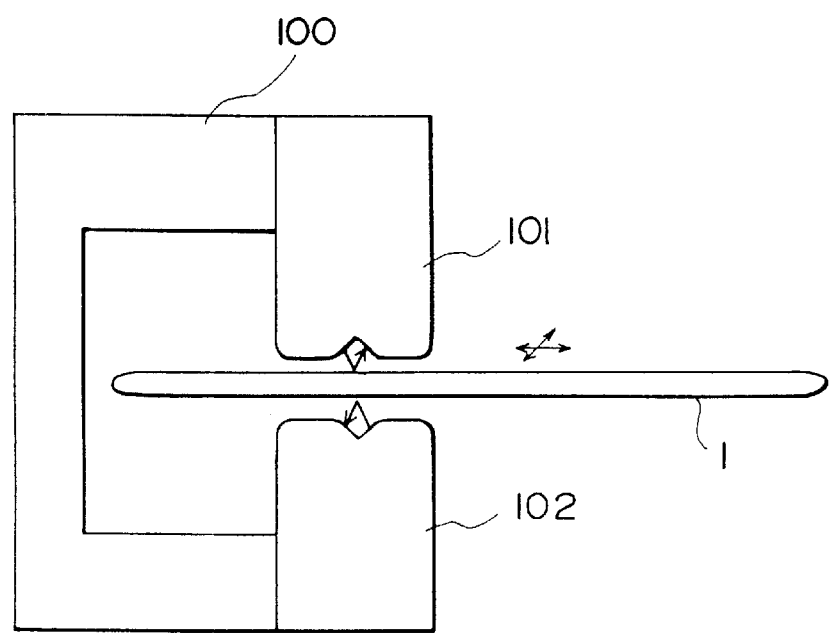
FIG. 13 is a view showing a related art.

FIG. 12 shows the thin board holding device 2A described before in connection with FIG. 1, which is supported on a reference surface A. On the reference surface A is disposed a measuring instrument 7 for measuring the level from the reference surface A.

The measuring instrument 7 comprises a body 7a accommodating computing means for computing the thickness of the thin board from the measured level data, and a measuring part 7b. The measuring part 7b has dial gauge function and is movable horizontally to the left and right in the figure.

As shown in FIG. 12, by storing the dimension D between the reference surface A, i.e., the lower surface 2Ab of the holding device, and the thin board holding surface of 3a each spot support 3 as the computational constant T in the measuring instrument body 7a, the thickness of the thin board 1 can be measured by taking the difference (Y−T) of the computational constant T from the measured level Y of the upper surface S of the supporting portions of the thin board 1 supported in the multiple point support fashion on the spot supports 3.

In this embodiment, a thin board holding means, which includes the number of spot supports having the thin board holding surfaces for adsorption holding one surface of a thin board and can hold the thin board by the multiple point support fashion on the spot supports, and a measuring the dimension of the thin board holding means from the reference surface in the thickness direction of the thin board, are provided. The thin board holding means and the measuring means are selectively replaceable.

Various thin board holding means suited to thin boards to be measured thus can be used interchangeably, and also various measuring means can also be used interchangeably. It is thus possible to provide a versatile thin board thickness measuring apparatus.

While in the above embodiment the measuring instrument has been of the contact type, i.e., is held in contact with a thin board to measure the level thereof. This is, however, by no means limitative; it is possible to use as well a non-contact type measuring instrument using, light, supersonic waves, etc.

It is further possible to use a flatness measuring instrument. Specifically, where the holding device is set on a measuring instrument for measuring the flatness with reference to an imaginary plane produced by a highly accurate mechanical motion, it is possible to compute the thickness of a thin board by the difference of the height of the thin board from the reference surface on the holding device.

Figure 10:
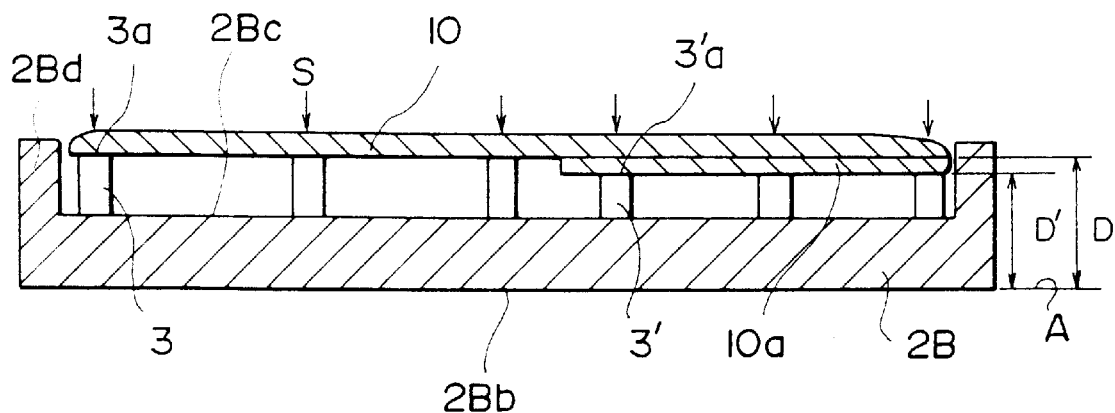
FIG. 10 is a view showing a second embodiment of the thin board holding device according to the invention.

FIG. 10 is a view showing a second embodiment of the thin board holding device according to the invention. Referring to the figure, the illustrated holding device 2B is made of a highly rigid material such as ceramics and has a tray-like shape. It has spot supports 3 and auxiliary spot supports 3' at a lower level than the spot supports 3, the spot supports 3 and 3' being disposed on its inner surface 2Bc surrounded by a peripheral wall 2Bd.

A thin portion of a wafer 10 is held on contact surfaces 3a of the spot supports 3, and a partial thick portion of the wafer 10 is supported on the contact surfaces 3'a of the auxiliary spot supports 3'.

A slight clearance is formed between the edge of the wafer 10 and the inner surface of the peripheral wall 2Bd. When the wafer 10 is moved along its plane, its edge strikes the inner surface of the peripheral wall 2Bd, and it is thus prevented from getting out of the holding device due to its lateral movement.

The contact surface 3a of each spot support 3 is spaced apart from a reference surface A with the holding device 2B placed thereon by a distance D, and the dimension to the contact surface 3'a of the spot support 3' from the reference surface A is set to D'.

The spot supports 3 and auxiliary spot supports 3', which are shown as spot support 3A in FIG. 3, each have a coaxial inner exhausting port 3Ab connected an exhausting mechanism (not shown). When a wafer 1 is placed on the spot support 3 or 3', it can be held attached thereto by suction through the exhausting port 3Ab.

With this construction, a stepped thin board 10 with a local stepped portion having a different thickness, may be held by the provision of the spot supports 3' which are reduced in different dimension in correspondence to the stepped portion.

The reduced dimension spot supports 3' may be interchangeably provided on the thin board holding device 2B, but desirably the spot supports 3 and 3' can be selectively detachably installed screwing.

With this construction, as shown in FIG. 10, the lower surface 2Bb of the holding device may be regarded as reference surface A, and the dimension D between the reference surface A and the contact surface 3a of the spot support 3 as computational constant T, and the dimension D' between the reference surface A and the contact surface 3'a of the spot support 3' as computational constant T' are stored in the said measuring instrument body 7a, and the thickness of the thin board 1 may be measured by taking the differences (Y−T) and (Y−T') of the computational constants T and T' from the measured level Y of the upper surface S of the supporting portions of the thin board 1 held in the multiple point support fashion on the spot supports 3.

Figure 11:
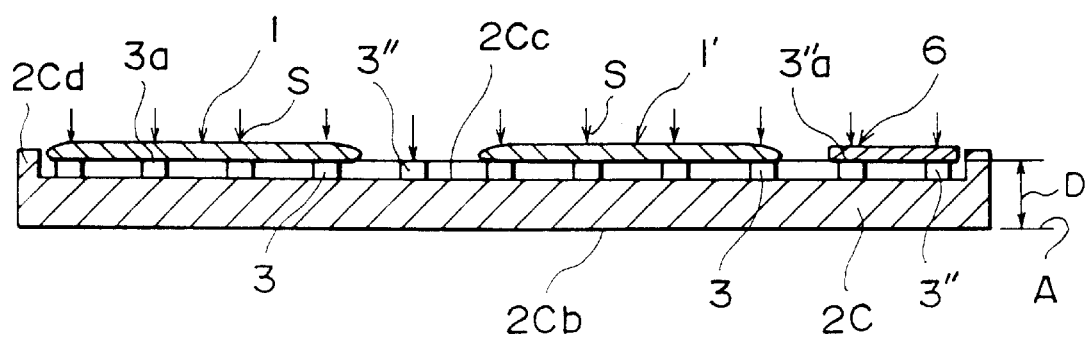
FIG. 11 is a view showing a third embodiment of the thin board holding device according to the invention.

FIG. 11 is a view showing a third embodiment of the thin board holding device according to the invention.

Referring to the figure, the illustrated thin board holding device 2C is made of a highly rigid material such as ceramics and has a tray-like shape, and it has spot supports 3 and an auxiliary spot supports 3" disposed on its inner surface 2Cc surrounded by the outer periphery 2Cd. A plurality of wafers 1, 1' can be held on the contact faces 3a of the spot supports 3.

The auxiliary spot supports 3" except one support a thickness gauge 6 with a thickness t held on their contact surfaces 3"a, and the other one supports nothing.

The contact surfaces 3a and 3"a of the spot supports 3 and 3" have the same dimension from the reference surface A with the holding device 2C placed thereon.

The holding device 2C has a large size so that it can hold the wafers 1, 1' and thickness gauge 6. When the wafers 1 and 1' and thickness gauge 6 are moved along their Plane, their edges strike the inner surface of the peripheral wall 2Cd. They are thus prevented from getting out of the holding device due to their lateral movement.

With this construction, with the provision of the spot supports 3" which do not support any thin board 1 and the spot supports 3 for supporting thin boards 1, the level D of the top face of the auxiliary spot supports 3' from the reference surface A may be measured to obtain a computational constant T as D=T.

In addition, the thickness gauge 6 with thickness t is held on the auxiliary spot supports 3", and the level Z of the top surface of the thickness gauge 6 from the reference surface A may be measured to obtain the computational constant T as Z−t=T.

The thickness of the tin board 1 can be measured by taking the difference (Y−T) of the computational constant T from the measured level Y of the upper surface S of the supporting portions of the thin board 1 held by the multiple point support fashion on the spot supports 3.

In this embodiment, when the computational constant T is not stored, it can be computed by measuring the level of the top face of the auxiliary spot supports or the upper surface of the thickness gauge.

As shown in FIG. 11, a plurality of thin boards can be held, and once they are held, their thickness can be measured at a time with the measuring instrument 7 as shown in FIG. 12. It is thus possible to obtain quick thin board thickness measurement.

As has been shown above, according to the invention thin boards are held in the multiple point support fashion, and deterioration of their flatness by dust particles introduced into the space between the thin board and the supporting surfaces is less liable compared to the case where the thin board is supported over the entire surface.

In addition, the thin board is held attached by a constant sucking force to the spot supports, so that it is possible to obtain stable measurement accuracy at a plurality of spots after removing variations of the measurement pressure due to different degrees of skill of operators and also instability of holding of the thin board.

By moving a measuring terminal of a measuring instrument to a measuring point on the thin board, which has one surfaces set on the thin board holder, the level of the upper surface of the thin board from a reference position supporting the thin board holding device at a reference position can be measured, therefore the thickness of thin board can be computed as computational contact the dimension between the said reference position and the adsorption surface of thin board from the said measurement data on the upper surface of said thin board.

It is thus possible to provide a method of and an apparatus for thin board thickness measurement, which permit thickness measurement of even a very fragile silicon wafer with far low possibility of breakage.

As been described in the foregoing, according to the invention it is possible to provide a thin board holding device and also a method of and an apparatus for thin board thickness measurement, which permit accurate thickness measurement, without possibility of breakage, of even a large diameter and fragile thin board such as a silicon wafer with a simple construction.

By the way, the term "thin board" described through the specification and claims is meant a thin plate-like board including all those one's whatever a metal or non-metal piece and disc-like board such as a semiconductor wafer or sheet-like such as a paper sheet, and also the term "in a plane state" is meant that the thin board is in a plane state which is perpendicular or parallel to or at any angle crossing to the gravitational direction.

What is claimed is:

1. The thin board holding device for holding a thin board in a plane state to measure the thickness of the thin board, comprising an adsorption portion including a plurality of spot supports for receiving one surface of said thin board to hold said thin board in a multiple point support fashion such that said thin board is held attached by adsorption to said spot support, wherein the dimension between a reference surface with said thin board holding device placed thereon and the surface of said adsorption portion in contact with each thin board is set to a predetermined dimension as a computational constant, and wherein said adsorption portion has two or more different surfaces to be in contact with a thin board to be able to set two or more values as said predetermined dimension for holding a thin board having locally different thicknesses.

2. A thin board holding device for holding a thin board in a plane state to measure the thickness of the thin board, comprising an adsorption portion including a plurality of spot supports for receiving one surface of said thin board to hold said thin board in a multiple point support fashion such that said thin board is held attached by adsorption to said spot support, wherein said spot supports each include:

adsorbing means having an elastic skirt portion;

a spherical projection extending from the bottom of a space defined by said skirt portion to the top opening of said adsorbing means and having a lower level end portion than the level of said skirt portion; and an air suction opening formed in said bottom;

said thin board being held in contact with an end portion of said spherical projection by suction through said opening.

3. The thin board holding device for holding a thin board in a plane state to measure the thickness of the thin board, comprising an adsorption portion including a plurality of spot supports for receiving one surface of said thin board to hold said thin board in a multiple point support fashion such that said thin board is held attached by adsorption to said spot support, wherein said spot supports are detachable from said thin board holding device.

4. A method of measuring the thickness of a thin board in a plane state comprising the steps of:

holding one surface of said thin board attached by adsorption to a number of thin board holding surfaces being located apart at a predetermined distance from a reference surface; and measuring the thickness of said thin board by taking the difference between the dimension between the other surface of said thin board and said reference surface and the dimension between said thin board holding surfaces and said reference surface.

5. The method of thin board thickness measurement according to claim 4, wherein the dimension between said thin board holding surfaces and said reference surface is preliminarily stored as a computational constant, and the dimension between said other surface of said thin board and said reference surface is measured and used as data together with said computational constant to calculate the thickness of said thin board.

6. The method of thin board thickness measurement according to claim 5, wherein;

said thin board is held in a multiple point support fashion using a thin board holding means having a number of spot supports for receiving one surface of said thin board; and the level of the opposite side portions of the other surface of said thin board being corresponded to the said thin board holding surfaces is measured.

7. The method of thin board thickness measurement according to claim 4, wherein a projection surface, in addition to said holding surface, is provided such that it is spaced apart from said reference surface by the same distance as the distance from said reference surface to said thin board holding surface, and the dimension between the other surface of said thin board and said reference surface, and the dimension between said projection surface and the reference surface are measured.

8. The method of thin board thickness measurement according to claim 7, wherein:

the thin board holding means is prepared with a number of spot supports having said holding surface for supporting by adsorption one surface of said thin board;

the dimension between said reference surface and said projection surface in contact with said thin board is measured as a computational constant;

the level of the opposite side portions of the other surface of said thin board corresponding to said thin board holding surfaces is measured;

and the difference between said measured level and said computational constant is taken as the thickness of said thin board.

9. The method of thin board thickness measurement according to claim 7, wherein;

the thin board holding means is prepared with a number of spot supports having said holding surface for supporting by adsorption one surface of said thin board;

one surface of a thickness gauge is supported on said projection surface;

the dimension between said reference surface and said projection surface is obtained as a computational constant from both the measured level from said reference surface to the other surface of said thickness gauge and the dimension of thickness of said thickness gauge; and the difference between the measured level of the other surface of said thin board and said computational constant is taken as the thickness of said thin board.

10. A device for measuring the thickness of a thin board in a plane state comprising:

thin board holding means including a number of spot supports each having a thin board holding surface for holding by adsorption one surface of said thin board, said thin board being held in a multiple point support fashion by said spot supports;

measuring means for measuring the dimension from the reference surface of said thin board holding means in the direction of the thickness of said thin board; and computing means for computing the difference between the dimension from said reference surface to said thin board holding surfaces of said spot supports in contact with said thin board and the dimension from said reference surface to the other surface of said thin board.

11. The device for thin board thickness measurement according to claim 10, wherein the dimension between said reference surface and said thin board holding surfaces of said spot supports in contact with said thin board is set as a computational constant.

12. The device for thin board thickness measurement according to claim 11, wherein said thin board holding means has two or more different surfaces to be in contact with a thin board to be able to set two or more values as said predetermined dimension for holding a thin board having locally different thickness.

13. A device for thin board thickness measurement according to claim 10, wherein said spot supports each include:

adsorbing means having an elastic skirt portion;

a spherical projection extending from the bottom of a space defined by said skirt portion to the top opening of said adsorbing means and having a lower level end portion than the level of said skirt portion; and an air suction opening formed in said bottom;

said thin board being held in contact with an end portion of said spherical projection by suction through said opening.

14. The device for thin board thickness measurement according to claim 10, wherein said spot supports are detachable from said thin board holding device.

15. The device for thin board thickness measurement according to claim 10, which further comprises a projection surface spaced apart from a reference surface by the same distance as the distance from said reference surface to the surface of said spot supports in contact with said thin board.

16. The device for thin board thickness measurement according to claim 10, wherein said thin board holding means can hold one surface of a plurality of thin boards, the thickness of said plural thin boards can be measured at a time by measuring the level of the other surface of said plural thin boards.

* * * * *